No. 872,410. PATENTED DEC. 3, 1907.
W. P. GRANNIS.
BUGGY SEAT ATTACHMENT.
APPLICATION FILED APR. 25, 1907.
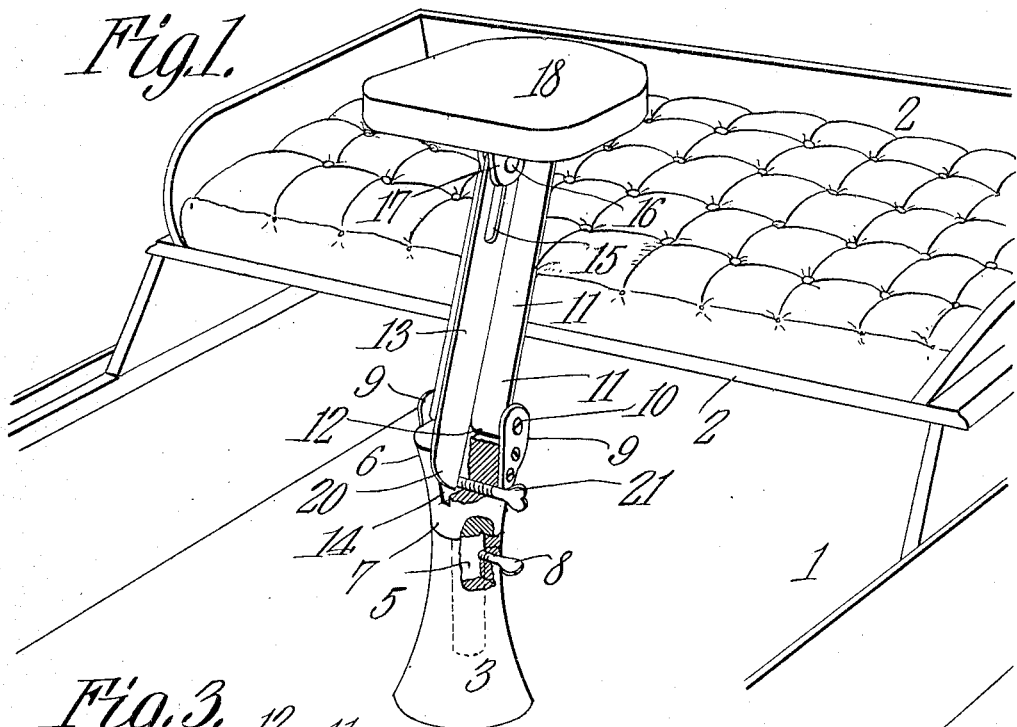
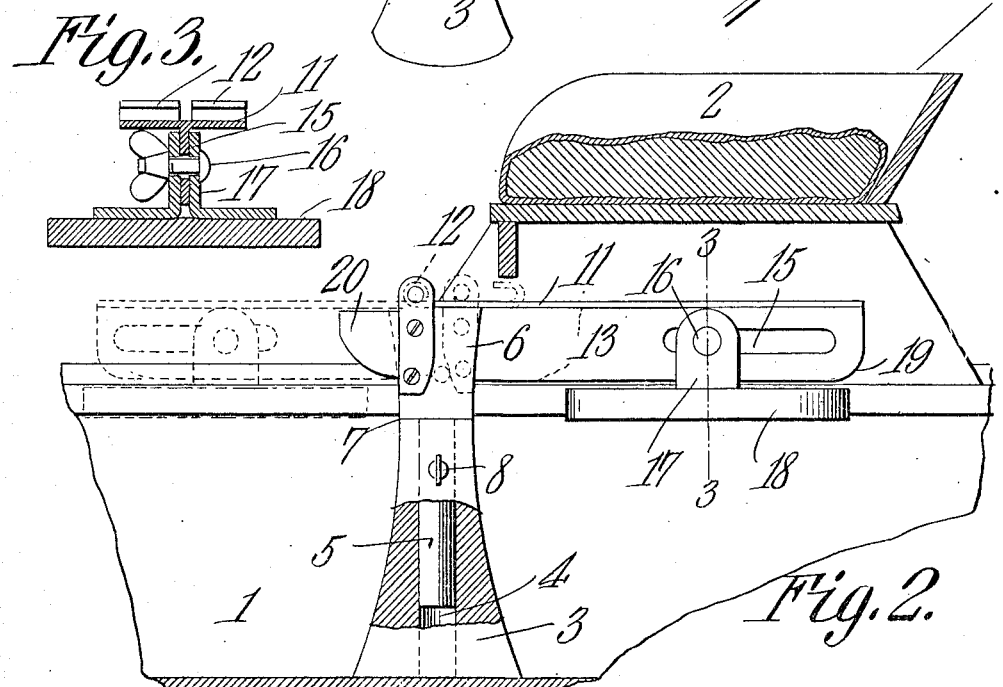
WITNESSES: William P. Grannis, INVENTOR.
By C. A. Snow & Co.
ATTORNEYS
THE NORRIS PETERS CO., WASHINGTON, D. C.

UNITED STATES PATENT OFFICE.

WILLIAM P. GRANNIS, OF KENDALLVILLE, INDIANA.

BUGGY-SEAT ATTACHMENT.

No. 872,410.  Specification of Letters Patent.  Patented Dec. 3, 1907.

Application filed April 25, 1907. Serial No. 370,297.

*To all whom it may concern:*

Be it known that I, WILLIAM P. GRANNIS, a citizen of the United States, residing at Kendallville, in the county of Noble and State of Indiana, have invented a new and useful Buggy-Seat Attachment, of which the following is a specification.

This invention relates to improvements in vehicle seats, and it has for its object to provide an improved auxiliary seat adapted to be moved into and out of coöperative relation to the usual or ordinary vehicle seat and serving to supplement the capacity thereof, the present invention providing a seat of this character that may be readily brought into operative position and firmly secured so as to accommodate an additional person, and when not in use, it is capable of being compactly folded and swung into an inoperative position beneath the ordinary seat, so that it does not encroach on the available space within the vehicle body.

To these and other ends, the invention comprises the various novel features of construction and combination and arrangement of parts, which will be hereinafter more fully described, and pointed out particularly in the claims appended hereto.

In the accompanying drawings:—Figure 1 is a perspective view of an auxiliary vehicle seat constructed in accordance with my present invention, the seat being shown in operative position. Fig. 2 represents a side elevation of the seat, the full lines indicating the position thereof beneath the vehicle seat, and the dotted lines indicating the relative position of the parts before they are swung beneath the vehicle seat. Fig. 3 represents a section on the line 3—3 of Fig. 2.

Corresponding parts in the several figures are indicated throughout by similar characters of reference.

The auxiliary seat shown in the present embodiment of the invention is especially adapted for use in buggies, wagons and other vehicles wherein it is desirable to supplement the seating capacity, the vehicle body 1, in the present instance, being provided with an ordinary seat 2 extending transversely of its length.

The auxiliary seat comprises, in the present instance, a standard 3 secured to the bottom of the vehicle body at a point directly beneath the forward edge of the seat and preferably midway of the width of the body, the standard being provided with a vertical bore 4 into which is fitted a journal portion 5 of a swivel member 6, the latter having a shoulder 7 thereon arranged to rest upon the upper end of the standard and thereby sustain the weight imposed upon it by the seat, rotation of the swivel member relatively to the standard taking place in a horizontal plane. In order to lock the seat supporting parts in either the operative or inoperative positions, the standard is provided with a set screw 8 which extends through one of the walls of the vertical bore and coöperates with the journal portion therein.

On the upper end of the swivel member are secured a pair of hinge members 9 that are connected by a pin 10, the latter being spaced slightly above the top of the swivel member and preferably offset to one side of the axis of the swivel member. Fitting between the pin 10 and the top of the swivel member is a seat supporting section 11, the latter having one end rolled up, as at 12, to fit the pin and serves as a hinge member to permit a relative turning movement between the seat supporting section and the swivel head. The seat supporting section is provided at one side with a flange 13 which is arranged to operate through a vertical slot 14 in the swivel head, and this flange has a longitudinal slot 15 formed therein to receive a pivot pin 16 which is carried by the supporting bracket 17 of the auxiliary seat 18, the latter being capable of a longitudinal movement relatively to the seat supporting section, and the longitudinal slot extends sufficiently close to the free end of the seat supporting section to permit the seat to turn about the pivot pin 16 and rest upon the end of the seat supporting section, the corner 19 of the flange being cut away to facilitate the relative pivotal movement of the seat and its supporting section. The end of the latter opposite to that having the seat is provided with an extension 20 which projects beyond the hinge portion, this extension, in the present instance, being formed by a prolongation of the flange 13. This extension operates in the slot 14 as the seat supporting section is turned about the pin 10 as a center, and extending through the swivel head is a locking or set screw 21 which extends transversely across the slot 14 thereof and clamps against the extension or projection 20 of the seat supporting section when the latter is in operative position, the locking pin or screw serving to prevent relative forward and rearward movement thereof, the auxiliary seat being thereby locked in operative position. When it is desirable to move the auxiliary seat into an inoperative position, the clamping or pivot screw 16 is loosened and the seat is turned from a position at the end of the seat supporting section to a position parallel with it, and then it is slid toward the standard, and after the locking pin or screw 21 has been loosened, the seat supporting section may be turned forwardly until it occupies a horizontal position, and after the screw 8 has been loosened, the swivel head and its coöperating parts may be turned in a horizontal position until the seat is beneath the seat of the vehicle body, tightening of the screw 8 serving to retain the auxiliary seat in inoperative position.

When the auxiliary seat is employed on vehicle bodies that are relatively narrow in width, the seat supporting section may be slid rearwardly on the swivel head before the latter is turned, the hinge member being open at one side to detachably engage the pin when the seat supporting section is in horizontal position, and this will more nearly center the parts so that they will clear the sides of the vehicle body as they are turned into inoperative position.

By clamping that portion of the seat supporting section extending beyond the pivot by the screw 21, the auxiliary seat may be locked in various different positions in a direction forwardly and rearwardly relatively to the vehicle.

What is claimed is:—

1. In an auxiliary seat for vehicles, the combination with a standard adapted to be secured to the vehicle body, of a seat supporting section mounted to turn in horizontal and vertical planes relatively thereto, and a reversible seat mounted on the seat supporting section and adjustable longitudinally of the latter.

2. In an auxiliary seat for vehicles, the combination with a supporting standard, of a swivel head pivoted to turn in a horizontal plane relatively thereto, a seat supporting section mounted on the swivel head and pivoted to swing in a vertical plane relatively thereto, and a reversible seat mounted on the free end of said section and pivoted to swing in a vertical plane relatively thereto.

3. In an auxiliary seat for vehicles, the combination with a standard adapted to be secured to the vehicle body and having a vertical bore, of a swivel head seated on and supported by the upper end of said standard and having a vertical journal fitting said bore for permitting relative turning movement between the swivel head and the standard, of a seat supporting section pivotally mounted for vertical adjustment on the swivel head about a horizontal axis, a seat slidable longitudinally on the said section and capable of a pivotal movement to permit the seat to move into and out of operative positions, and a device coöperating with the journal of the swivel head for locking the latter in fixed relation to the standard.

4. In an auxiliary seat for vehicles, the combination with a standard adapted to be secured to the vehicle body, of a swivel head mounted to turn in a horizontal plane relatively to the standard, a pivot pin carried by said head, a seat supporting section slidable in a direction transversely of the axis of said head, and having a hinge member formed thereon to coöperate with the pivot pin and permit relative pivotal movement between the said section and the swivel head in a vertical plane, and means for locking the seat supporting section in operative position.

5. In an auxiliary seat for vehicles, the combination with a supporting standard, of a swivel head having a vertical pivot coöperating with said standard, a pivot pin carried by the swivel head, a seat supporting section having a hinge member formed thereon and coöperating with said pivot pin and provided with a longitudinally extending flange, a seat supported by the flange of the seat supporting section, and a device coöperating with said flange for locking the said section in operative position.

6. In an auxiliary seat for vehicles, the combination with a supporting standard, of a swivel head mounted to turn in a horizontal plane relatively thereto, a seat supporting section mounted on the swivel head and pivoted to turn in a vertical plane relatively thereto, and having a longitudinally extending flange provided with a slot adjacent to the free end of the section, the opposite end of the flange extending beyond the pivot of the section, a seat guided on said flange and having a pivot pin coöperating with the slide therein to permit a relative longitudinal and pivotal movement between the seat and the supporting section, and a locking device operating with that portion of the flange extending beyond the pivot for retaining the section in operative position.

In testimony that I claim the foregoing as my own, I have hereto affixed my signature in the presence of two witnesses.

WILLIAM P. GRANNIS.

Witnesses:
M. C. WILDMAN,
ADIN L. HALLER.